United States Patent
Bloom

(10) Patent No.: US 7,054,051 B1
(45) Date of Patent: May 30, 2006

(54) DIFFERENTIAL INTERFEROMETRIC LIGHT MODULATOR AND IMAGE DISPLAY DEVICE

(75) Inventor: David M. Bloom, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 0 days.

(21) Appl. No.: 10/904,766

(22) Filed: Nov. 26, 2004

(51) Int. Cl.
*G02F 1/01* (2006.01)

(52) U.S. Cl. .................................... 359/276

(58) Field of Classification Search ............ 359/279, 359/251, 276, 283, 303, 337.22, 431, 438, 359/496, 483, 514, 583
See application file for complete search history.

(56) References Cited

U.S. PATENT DOCUMENTS

| | | | |
|---|---|---|---|
| 4,710,732 A | 12/1987 | Hornbeck | |
| 4,758,092 A | 7/1988 | Heinrich | |
| 5,311,360 A | 5/1994 | Bloom | |
| 5,611,005 A * | 3/1997 | Heismann et al. | 385/11 |
| 5,661,592 A | 8/1997 | Bornstein | |
| 5,982,553 A | 11/1999 | Bloom | |
| 6,088,102 A | 7/2000 | Manhart | |
| 6,449,048 B1 * | 9/2002 | Olszak | 356/497 |
| 6,466,354 B1 | 10/2002 | Gudeman | |
| 6,522,792 B1 * | 2/2003 | Sugamata et al. | 385/2 |
| 6,724,515 B1 | 4/2004 | Kowarz | |
| 6,934,068 B1 * | 8/2005 | Kochergin | 359/280 |

* cited by examiner

*Primary Examiner*—Hung Xuan Dang
*Assistant Examiner*—Tuyen Tra
(74) *Attorney, Agent, or Firm*—Morrison Ulman

(57) ABSTRACT

A light modulator incorporates a polarization sensitive prism and a novel MEMS ribbon device to impart a relative phase shift to polarization components of an incident light beam. A linear array of phase shifting elements in the MEMS device creates a linear image which is scanned to form a two dimensional scene. Alternatively the deflection of each cantilever in a linear array of atomic force microscope cantilevers may be measured simultaneously.

10 Claims, 5 Drawing Sheets

US 7,054,051 B1

DIFFERENTIAL INTERFEROMETRIC LIGHT MODULATOR AND IMAGE DISPLAY DEVICE

TECHNICAL FIELD

The invention relates generally to visual display devices and light modulators. In particular it relates to differential interferometric light modulators containing polarizing prisms.

BACKGROUND

Display devices such as television sets and movie projectors often incorporate a modulator for the purpose of distributing light into a two-dimensional pattern or image. For example, the frames of a movie reel modulate white light from a projector lamp into shapes and colors that form an image on a movie screen. In modern displays light modulators are used to turn on and off individual pixels in an image in response to electronic signals that control the modulator.

Texas Instruments introduced a microelectromechanical, integrated circuit chip, light modulator called a digital mirror device which includes millions of tiny mirrors on its surface. Each mirror corresponds to a pixel in an image and electronic signals in the chip cause the mirrors to move and reflect light in different directions to form bright or dark pixels. See, for example, U.S. Pat. No. 4,710,732 incorporated herein by reference. Stanford University and Silicon Light Machines developed a microelectromechanical chip called a grating light modulator in which diffraction gratings can be turned on and off to diffract light into bright or dark pixels. See, for example, U.S. Pat. No. 5,311,360 incorporated herein by reference.

Both of these reflective and diffractive light modulation schemes for displays involve two-dimensional arrays of light modulator elements. However, it is also possible to make a display in which light is incident on a linear array of light emitters or high speed light modulators. With appropriate magnifying optics and scanning mirrors, a linear array can be made to appear two-dimensional to an observer. Through the scanning action of a vibrating mirror a single row of light modulators can be made to do the work of as many rows of modulators as would be necessary to provide a real two-dimensional display of the same resolution. See, for example, U.S. Pat. No. 5,982,553 incorporated herein by reference.

Many microelectromechanical light modulators are compatible with digital imaging techniques. Digital information may be sent electronically to the modulator. For example, gray scale images may be achieved by turning pixels on only part time. A pixel that is switched from bright to dark with a 50% duty cycle will appear to an observer to have a constant intensity half way between bright and dark. However, the pixel must be switched between bright or dark states faster than the human eye's critical flicker frequency of roughly 30 Hz or else it will appear to flicker. Therefore two-dimensional digital light modulators for displays must switch between states quickly to display a range of light levels between bright and dark.

A one-dimensional digital light modulator array, scanned by a vibrating mirror to make it appear two-dimensional, must incorporate modulators with fast switching speeds. Each modulator element must switch on and off quickly to provide the impression of gray scale and this action must be repeated for each pixel in a line within the scanning period of the mirror. Grating light modulator devices in particular exhibit high switching speeds because their mechanical elements move only very short distances. The grating light modulator incorporates parallel ribbon structures in which alternating ribbons are deflected electrostatically to form diffraction gratings. The ribbons need only move a distance of one quarter wavelength of light to switch a grating on or off. It is also possible (and desirable in many instances) to operate one- or two-dimensional light modulators in analog, rather than digital, modes.

One limitation of the grating light modulator is that at least two ribbons are required in order to form a diffractive modulator element. Therefore each pixel requires at least two ribbons each of which uses up valuable space on a chip. Another limitation of grating light modulators is that they require collimated light sources. Gudeman proposed an interferometric light modulator based on a mechanical structure very similar to the grating light modulator; see U.S. Pat. No. 6,466,354 incorporated herein by reference. Gudeman's light modulator is a form of Fabry-Perot interferometer based on a ribbon structure.

Microelectromechanical light modulators typified by the Texas Instruments' digital mirror device and Stanford/Silicon Light Machines grating light modulator devices mentioned above have already enjoyed wide commercial success and have spawned other related designs. See, for example, U.S. Pat. No. 6,724,515 incorporated herein by reference. However, they are not without limitations and there is room for improvement.

The digital mirror device is comparatively slow and therefore is usually supplied as a two-dimensional mirror array. Usually two dimensional modulator arrays are more expensive to make than one-dimensional arrays and require a sophisticated addressing scheme for the mirrors. A two-dimensional array requires defect-free manufacturing of N×N pixels over a large chip area while a one-dimensional array with the same image resolution requires only N working pixels on a chip in a single line.

Grating light modulator devices, while very fast, require more than one ribbon structure per pixel as noted above. They are also affected by limitations due to diffraction. A grating light modulator has a reflective state or configuration and a diffractive state. In the diffractive state incoming light is diffracted into the +1 and −1 diffraction orders of an optical grating. However, only about 80% of the light is collected in these two orders. Light diffracted into higher orders is lost and overall light efficiency suffers.

Grating-based devices use high numerical aperture optical elements to collect diffracted light. It would be desirable for a modulator to be able to use simpler, low numerical aperture optics. Grating-based devices also have some difficulty achieving high contrast in the dark state; i.e. displaying black areas in an image. A light modulator that escaped as many of the limitations of existing modulator designs as possible would be highly desirable.

SUMMARY

An aspect of the invention provides a novel interferometric light modulator combined with a scanner and projection optics to form a visual display system. The light modulator incorporates a polarization sensitive prism and a novel MEMS device to impart a relative phase shift to polarization components of an incident light beam. A linear array of phase shifting elements in the MEMS device creates a linear image which is scanned to form a two dimensional scene.

A further aspect of the invention provides a linear array of atomic force microscope cantilevers in place of the MEMS device. In this application, an aspect of the invention provides a device for simultaneously measuring the deflection of each cantilever in a linear array.

BRIEF DESCRIPTION OF THE DRAWINGS

The drawings are heuristic for clarity. The foregoing and other features, aspects and advantages of the invention will become better understood with regard to the following descriptions, appended claims and accompanying drawings in which:

DETAILED DESCRIPTION

An aspect of the invention provides a novel light modulator, a scanner and projection optics as a system for displaying images to an observer. The system has several desirable features including high contrast and speed.

According to an aspect of the invention a novel light modulator incorporates a polarizing prism to split light beams into components of orthogonal polarization. These polarization components are made to travel unequal distances in the modulator and are then recombined in the prism. When one polarization component is phase shifted with respect to the other, the overall polarization of the recombined beam is transformed. The polarization of the recombined beam is then analyzed by a polarizing beam splitter. Light intensity output from the polarizing beam splitter depends on the polarization state of the incident light beam which in turn depends on the relative phase shift of the polarization components.

A phase shift is imparted to the orthogonal polarization components in the modulator by focusing them on, and causing them to reflect from, an engineered, uneven surface. This phase shift surface has regions of slightly different displacement which cause the light beams to travel slightly different distances upon reflection. More specifically a novel microelectromechanical system (MEMS) ribbon array device is provided that is used to modulate the phase shift of light beams reflected from the surface of its ribbons.

The MEMS ribbon array device has several advantages over conventional devices including the property that a single ribbon in the device represents a single pixel in a line image. Further, non-active areas of the device do not cause artifacts in a displayed image because they lie at the same surface height. Features in the device at the same surface height do not cause relative phase shifts in light that reflects from the device and therefore do not appear at the output of the interferometer.

Furthermore, although aspects of the invention are described below primarily in terms of their applicability to image display, they may also be used profitably to perform other functions such as parallel readout of cantilever position in a linear array of atomic force microscope (AFM) cantilevers. A simple readout for an array AFM would be of great benefit in advanced semiconductor manufacturing since the AFM is useful for both surface characterization and lithography. Alternatively, an array of movable cantilevers could be used in place of the MEMS ribbon device as phase shifting elements for a display.

Figure 1B:
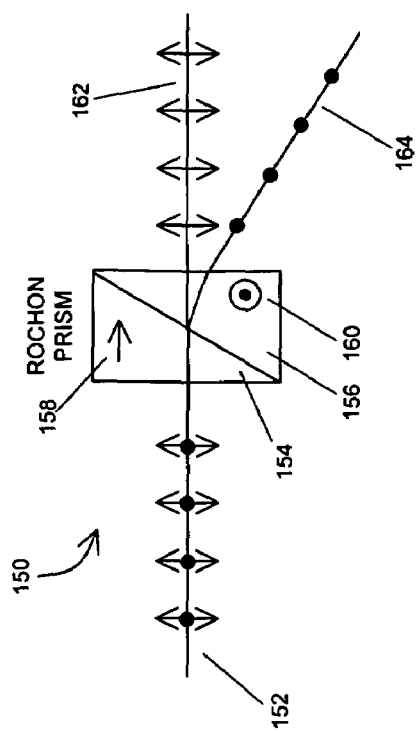
FIGS. 1A and 1B show schematically the propagation of light through Wollaston or Rochon prisms respectively.
Figure 1A:
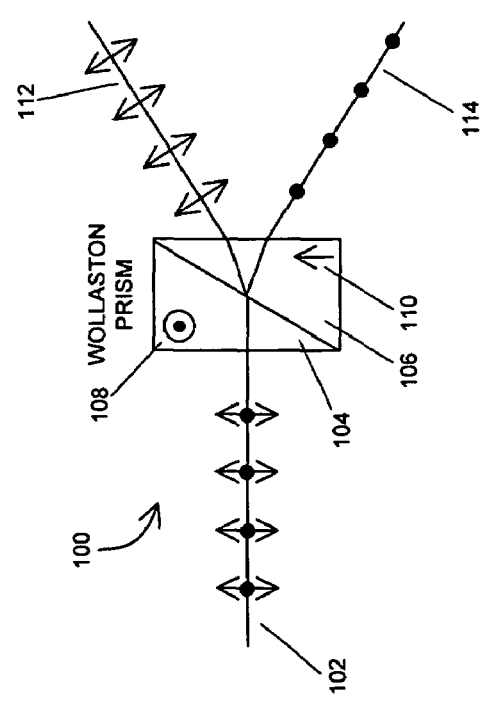

For purposes of gaining a clearer understanding of certain aspects of the invention it is useful to briefly review the properties of birefringent optical prisms such as the Wollaston 100 and Rochon 150 prisms shown in FIG. 1A and FIG. 1B respectively. An important characteristic of each of these polarizing prisms is that they split an incoming light beam into orthogonally polarized components that leave the prism in different directions.

In each of FIGS. 1A and 1B a linearly polarized light beam 102 or 152 enters a prism normal to one of the prism faces. The components of the polarization in the plane of the figure and perpendicular to the plane of the figure are shown by double-headed arrows and bull's-eye symbols respectively.

In the Wollaston prism illustrated in FIG. 1A one of the components of polarization of the light is oriented perpendicular to the optic axis of the prism and is designated the ordinary or "o" wave. The other component of polarization is oriented parallel to the optic axis of the prism and is designated the extraordinary or "e" wave. The Wollaston prism is comprised of two wedges 104 and 106 of a birefringent material such as quartz or calcite. The wedges are the same size and shape but are cut so that their optic axes are oriented perpendicular to one another when they are assembled to form the prism.

In wedge 104 the optic axis is oriented 108 normal to the plane of the figure while in wedge 106 the optic axis is oriented 110 in the plane of the figure and perpendicular to the direction of propagation of light beam 102.

Inside the Wollaston prism o and e waves experience slightly different refractive indices. In a quartz prism the difference in refractive indices is about 0.6%. In a positive uniaxial crystal such as quartz the o wave travels faster than the e wave because of its slightly lower refractive index. In a negative uniaxial crystal such as calcite the e wave experiences a lower refractive index and travels faster than the o wave.

When the e and o waves reach the boundary between the two halves of the Wollaston prism they are refracted. In addition the orientation of the optic axis of the crystal is reversed so that what was the o wave in the first half of the prism becomes the e wave in the second half and vice versa. The net effect is that an incoming wave is split into orthogonally polarized components 112 and 114 which exit the prism in different directions. The angle between the two waves is a function of the wedge angle of the two halves of the prism.

The Rochon prism, shown in FIG. 1B, is similar to a Wollaston prism except that the incident light beam 152 enters the first wedge 154 of the prism parallel to the optic axis 158 of the crystal. When the beam passes the boundary between the halves of the Rochon prism it enters second wedge 156 where the optic axis 160 is perpendicular to the direction of propagation and the light is split into o and e components. The o wave 162 passes through the entire prism with no angular deviation while the e wave 164 is deflected away from the original direction of propagation. A Senarmont prism (not shown) is very similar to a Rochon prism except that the orientation of the optic axis in the second half of the prism is such that the e wave passes straight through while the o wave is deflected.

Wollaston, Rochon, Senarmont and other birefringent prisms may be made from wedges of uniaxial birefringent crystals such as quartz, calcite, tourmaline, sodium nitrate, or rutile (TiO$_2$). The wedges are sometimes cemented together with glycerine or castor oil and sometimes not cemented at all if optical power handling requirements are high.

Figure 2A:
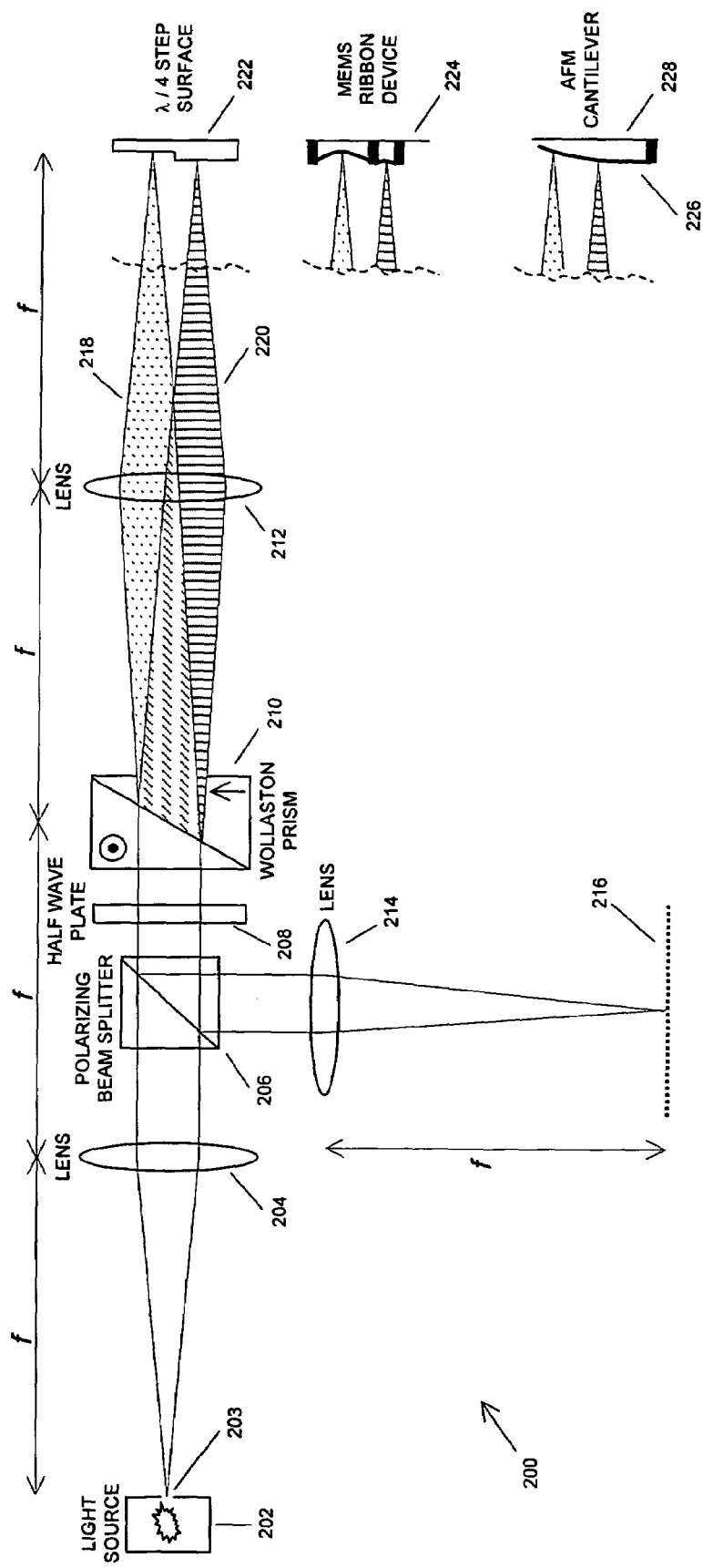
FIG. 2A shows an interferometric light modulator and various phase shifting surfaces.

FIG. 2A shows an interferometric light modulator according to an aspect of the invention. The light modulator comprises a light source, several lenses, polarization dependent optics, and a reflective phase shifting surface. The polarization dependent optics include a polarizing beam splitter, an optical ½-wave plate, and a birefringent prism such as a Wollaston prism or a Rochon prism. The phase shifting surface may take any one of several forms such as a ¼-wave step surface, a MEMS ribbon device, or an AFM cantilever array.

The viewpoint of FIG. 2 is such that operation of the modulator with only a single phase shifting surface is apparent. However, as described below, an interferometric light modulator according to an aspect of the invention may be operated with a linear array of phase shifting surfaces simultaneously. For example, the side view of MEMS ribbon device 224 corresponds to side view 302 in FIG. 3 of linear array MEMS ribbon device 300. Similarly, the side view of AFM cantilever 226 may represent a side view of the first cantilever in a linear array of AFM cantilevers.

Interferometric light modulator 200 illustrated schematically in FIG. 2A is an important part of a display system according to an aspect of the invention. Other parts of the display system include scanning devices and projection optics.

In FIG. 2A, light is generated by light source 202 and radiates through aperture 203. Light source 202 may be a lamp, laser, or other light source. Aperture 203 may be a small hole or a slit. Alternatively, aperture 203 may be inherent in the shape of the light source itself. For example a laser beam may be focused to a small spot or a lamp may have an elongated filament. Further, the light source may incorporate beam shaping optics (not shown) for the purpose of providing a circular, elongated slit-like, or other transverse shape to the radiated light. Slits, line sources, cylinder lenses, Powell lenses, and other condenser optics may all be used for shaping the light source.

Light from light source 202 is incident on lens 204 which is placed approximately one focal length away thereby collimating the light. After passing through lens 204 light traverses several optical elements before being focused by lens 212 onto a phase shifting surface such as ¼-wave step surface 222, MEMS ribbon device 224, or AFM cantilever array 226.

The optical elements between lens 204 and lens 212 are a polarizing beam splitter 206, an optical ½-wave plate 208, and a birefringent prism such as Wollaston prism 210. Although these elements are illustrated as separate components in the figure, they could also be combined into a single optical element.

Optical ½-wave plate 208 is optional. It is included because it is convenient to include it during optical prototyping of the modulator. If it were not included, the Wollaston prism and the phase shifting surface would have to be rotated 45 degrees around the axis of lens 212. Using optical ½-wave plate 208 makes it easier to align optical components and also easier to draw them in schematic diagrams such as FIG. 2A.

It is also possible to build a modulator that operates in exactly the same way as the one described in detail here by replacing polarizing beam splitter 206 and birefringent Wollaston prism 210 with a single Rochon or Senarmont prism. Such a modulator would have its image plane (analogous to image plane 216) located near, but off axis from light source 202. Lens 204 would additionally serve the function of lens 214.

After light is reflected from the phase shifting surface it passes back through lens 212, prism 210 and optical ½-wave plate 208. Modulated light is then directed by polarizing beam splitter 206 toward lens 214 and finally focused at image plane 216.

The optical elements of an interferometric light modulator just described function to split an incoming light beam into two polarization components that follow spatially distinct paths and then recombine the beam after light in one of the paths has undergone a phase shift with respect to light in the other path. To understand how this happens, consider light from light source 202 that has been collimated by lens 204. Polarizing beam splitter 206 passes a linearly polarized component of light incident on it. The linearly polarized light then passes through optical ½-wave plate 208 which is oriented so as to rotate the polarization by 45 degrees. In other words, the light now has in-phase polarization components in the plane of the figure and perpendicular to it. This light is split into two different propagation directions by Wollaston prism 210. One polarization 218 is deflected upward in the figure while the other 220 is deflected down. These two beams 218 and 220 are focused on a phase shifting surface such as ¼-wave step surface 222.

The Wollaston prism is placed such that the point where the incoming light beam is split into two is located half way between and one focal length away from lenses 204 and 212. Because lens 212 performs a spatial Fourier transform, angular deviations between light beams created in Wollaston prism 210 at one focal plane of the lens lead to transverse displacements in focal spots at the other focal plane. Therefore light beams 218 and 220 both arrive at ¼-wave step surface 222 normal to the surface but displaced laterally from the axis of lens 212.

Light beams 218 and 220 are reflected back on themselves at ¼-wave step surface 222 and travel back through lens 212 before being recombined in Wollaston prism 210. The combined beam passes through optical ½-wave plate 208 for the second time and its polarization is rotated back 45 degrees. Depending on the polarization state at this point the beam then either passes through polarizing beam splitter 206 back toward lens 204 and light source 202 or is reflected within the polarizing beam splitter toward lens 214 and image plane 216.

Whether or not the light is reflected toward lens 214 or passed straight through toward lens 204 depends on its polarization. The polarization of the light in turn is determined by the phase relationship between its polarization components in the plane of the figure and perpendicular to it. These are the polarization components 218 and 220 into which the Wollaston prism split the original incoming light beam. The phase relationship between the polarization components depends on the path length each component travels starting when the light beam is split in the Wollaston prism until the components are recombined on their return trip through the prism. Finally the path length difference depends on the topography of the phase shifting surface on which light beams 218 and 220 are focused by lens 212.

If the phase shifting surface is ¼-wave step surface 222, the path length difference for light beams 218 and 220 is ½ optical wavelength. The reason for this is that the step height on ¼-wave step surface 222 is ¼ optical wavelength.

Therefore light beam 218 travels 2×(¼ optical wavelength) or ½ optical wavelength farther than light beam 220 upon reflection from the phase shifting surface. When light beams 218 and 220 are recombined at Wollaston prism 210 the polarization of the recombined light beam is changed by 90 degrees because of the phase delay between its polarization components.

Figure 3:
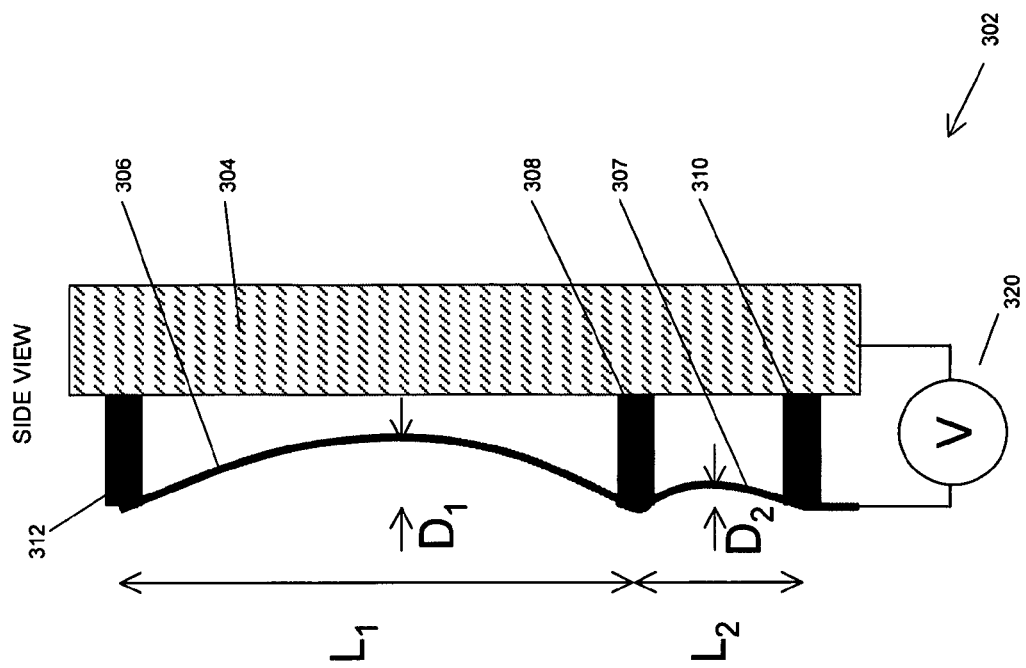
FIG. 3 shows schematically a MEMS ribbon device.
Figure 3:
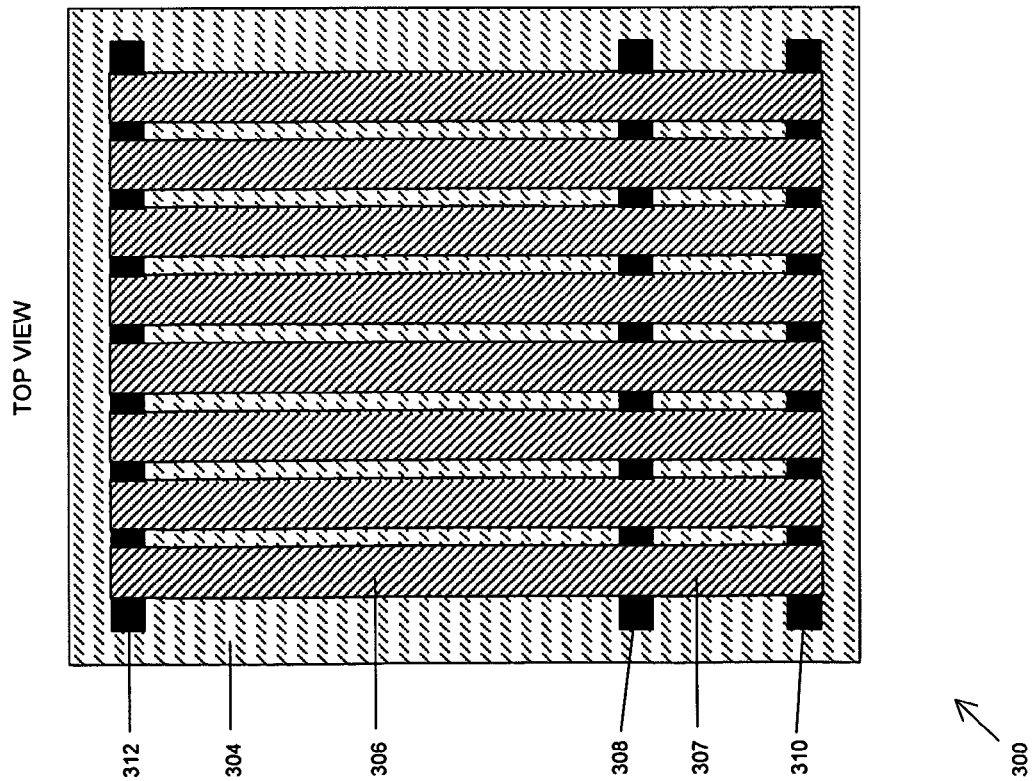

The 90 degree change in the polarization of the light causes the light to be reflected by polarizing beam splitter toward lens 214 rather than transmitted toward lens 204. Finally the light is focused at image plane 216. Therefore a ¼ optical wavelength height difference in the surfaces that reflect orthogonally polarized light beams 218 and 220 leads to maximum light output at image plane 216. It may be readily verified that when a MEMS ribbon device 224 (see also, FIG. 3) is used in place of ¼-wave step surface 222 the intensity of the light at image plane 216 is proportional to $\sin^2(kx)$ where x is the height difference of the surfaces that reflect orthogonally polarized light beams 218 and 220, and k is two times pi divided by the wavelength of the light. For example when voltage 320 is applied to a MEMS ribbon 306, 307 (as illustrated in FIG. 3) $x=D_1-D_2$.

The operating point of the interferometer may be adjusted by translating Wollaston prism 210 perpendicular to the axis defined by lenses 204 and 212 in such a way that light passes through different amounts of prism material in the two wedges that form the prism. As an example, this adjustment can be used to set the interferometer to have minimum output when voltage source 320 in FIG. 3 is set to zero.

In the interferometer, light beams 218 and 220 are orthogonally polarized. However, it is not necessary, and it is sometimes not desirable, for the two beams to be linearly polarized. Linear, perpendicular polarizations would be undesirable if, for example, a reflective phase shifting surface (e.g. 222, 224, 226) imparted a polarization dependent loss upon reflecting incident light. Orthogonal, but not linear, polarizations could be achieved by placing an optical ¼-wave plate between Wollaston prism 210 and lens 212, for example. Light beams 218 and 220 would then be orthogonally, circularly polarized and would suffer the same loss when incident on a reflective surface that imparts a polarization dependent loss.

Figure 2B:
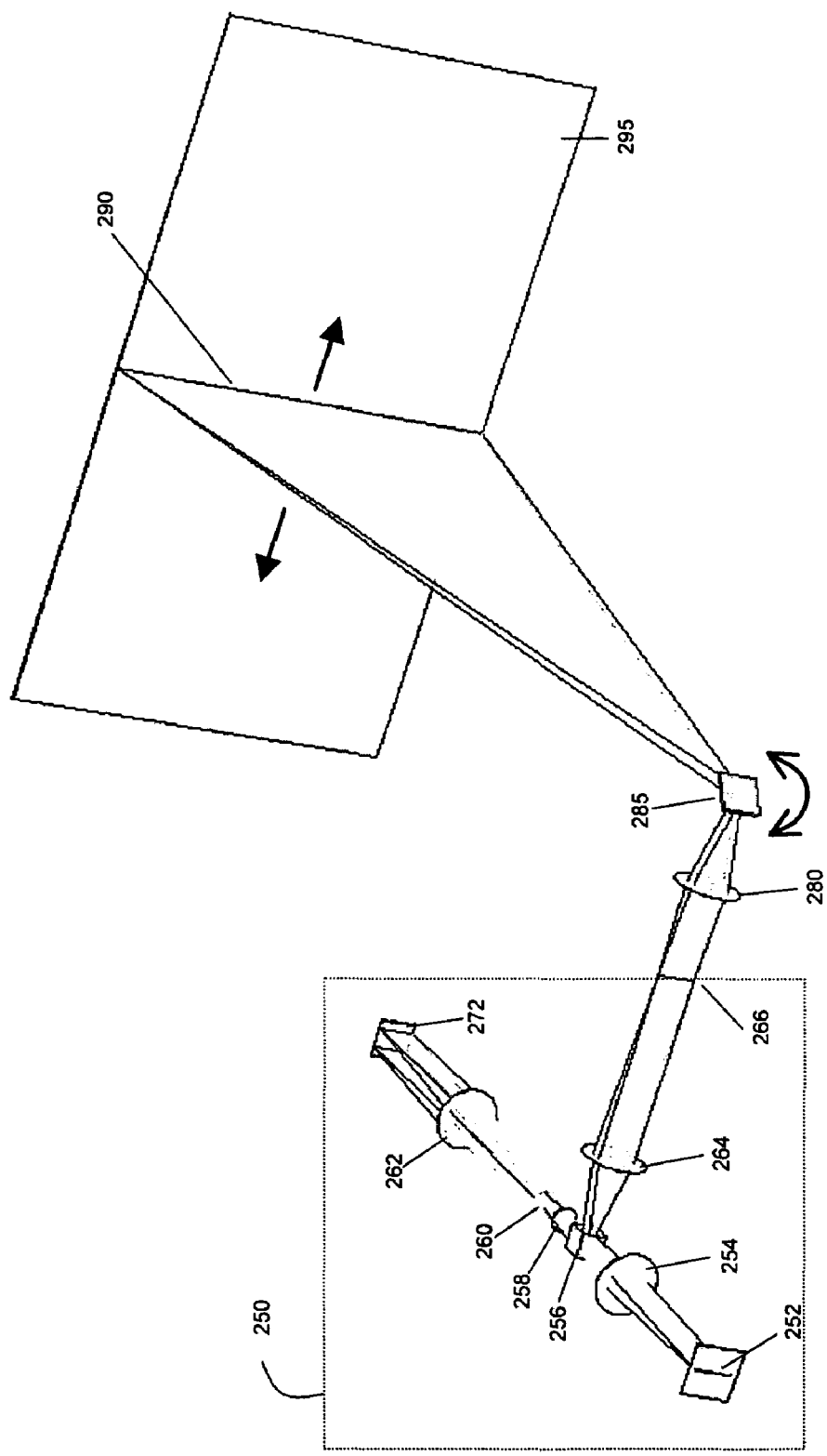
FIG. 2B shows an image display system including the modulator of FIG. 2A, a scanning mirror, projection lens, and viewing screen.

The linear array output that appears at image plane 216 in the interferometer as shown in FIG. 2A is scanned and projected as illustrated in FIG. 2B which shows a scanning mirror, projection optics and a viewing screen. The scanning and projection system permits the line of pixels output by the interferometer to appear to an observer as a two dimensional image.

In FIG. 2B, the optical system enclosed within dotted box 250 is a perspective view of the optical system illustrated in FIG. 2A. In the perspective view 250 it is apparent that when a line source 252 is used as the light source 202 and aperture 203 of FIG. 2A phase shifting device 272 may include a linear array of phase shifting surfaces such as arrays of surfaces 222, 224, or 226.

In FIG. 2B lenses 254, 262 and 264 correspond to lenses 204, 212 and 214 respectively in FIG. 2A. Similarly polarizing beam splitter 256, optical ½-wave plate 258, and Wollaston prism 260 correspond to polarizing beam splitter 206, optical ½-wave plate 208, and Wollaston prism 210. Finally image plane 266 corresponds to image plane 216.

In FIG. 2B projection lens 280 magnifies the line image formed at image plane 266. The magnified image 290 appears on viewing screen 295. Scanning mirror 285 scans or sweeps line image 290 back and forth across viewing screen 295 quickly enough that an observer sees a two dimension image on the screen. Reciprocating rotation or vibration of mirror 285 leads to the side-to-side movement of line image 290.

FIG. 3 shows top 300 and side 302 views of a MEMS ribbon device according to an aspect of the invention. The device incorporates a linear array of flexible, reflective ribbons. The purpose of each ribbon is to form a phase shifting surface for interferometric light modulator 200 described above.

Each ribbon in the MEMS ribbon device shown in FIG. 3 is supported at its ends by supports 312 and 310 and also at a point part way between the ends by support 308. Intermediate support 308 is intentionally located away from the midpoint between end supports 312 and 310. In the figure, support 308 is located closer to support 310 than support 312. The distance between support 312 and support 308 is represented by $L_1$ while the distance between support 308 and support 310 is represented by $L_2$. $L_1 > L_2$. Supports 312, 308, and 310 are fixed to solid base 304.

For purposes of discussion it is convenient to refer to each ribbon in the array as being composed of two parts such as ribbon segment 306 and ribbon segment 307 as shown in the figure. However, segments 306 and 307 are understood to be part of the same ribbon. Movement of segment 306 is isolated from movement of segment 307 because the ribbon is fixed to support 308.

The ribbons in the MEMS ribbon device illustrated in FIG. 3 are reflective to light. The ribbons are also electrically conductive while supports 312, 308, and 310 are electrical insulators. A ribbon in the device is deflected by electrostatic force when a voltage is applied between it and the electrically conductive base 304 as illustrated in side view 302.

When a voltage is applied between a ribbon and base 304, for example, by voltage source 320, the ribbon bends toward the base. However, ribbon segments 306 and 307 are deflected different amounts. Ribbon segment 306 is deflected by distance $D_1$ while segment 307 is deflected by distance $D_2$. Distance $D_1$ is greater than distance $D_2$ because length $L_1$ is longer than length $L_2$. It is important to note that a single voltage applied to a single ribbon causes its segments 306 and 307 to deflect different distances. The ribbon forms the phase shifting surface for the interferometer.

Each ribbon in the MEMS ribbon device is actuated by its own voltage signal. Therefore each ribbon represents a phase shifting surface to be used in the interferometer of FIG. 2A. When the linear array of ribbons is illuminated in an interferometer incorporating an elongated or slit-shaped light source each ribbon represents one pixel in a linear pixel array.

When several ribbons of the MEMS ribbon device are illuminated by an elongated slit-shaped light beam some of the light will fall between ribbons and be reflected back into the interferometer by the base 304. However, since the base is flat it does not impart a relative phase shift to light falling near ribbon segment 306 as compared to light falling near ribbon segment 307. Therefore one of the features of the interferometer is that the support and base structures do not appear in the output. In other words the interferometer has high common mode rejection which leads to high contrast in the dark state. The interferometer also has high rejection of common mode artifacts caused by vibration of the apparatus for the same reason.

Figure 4:
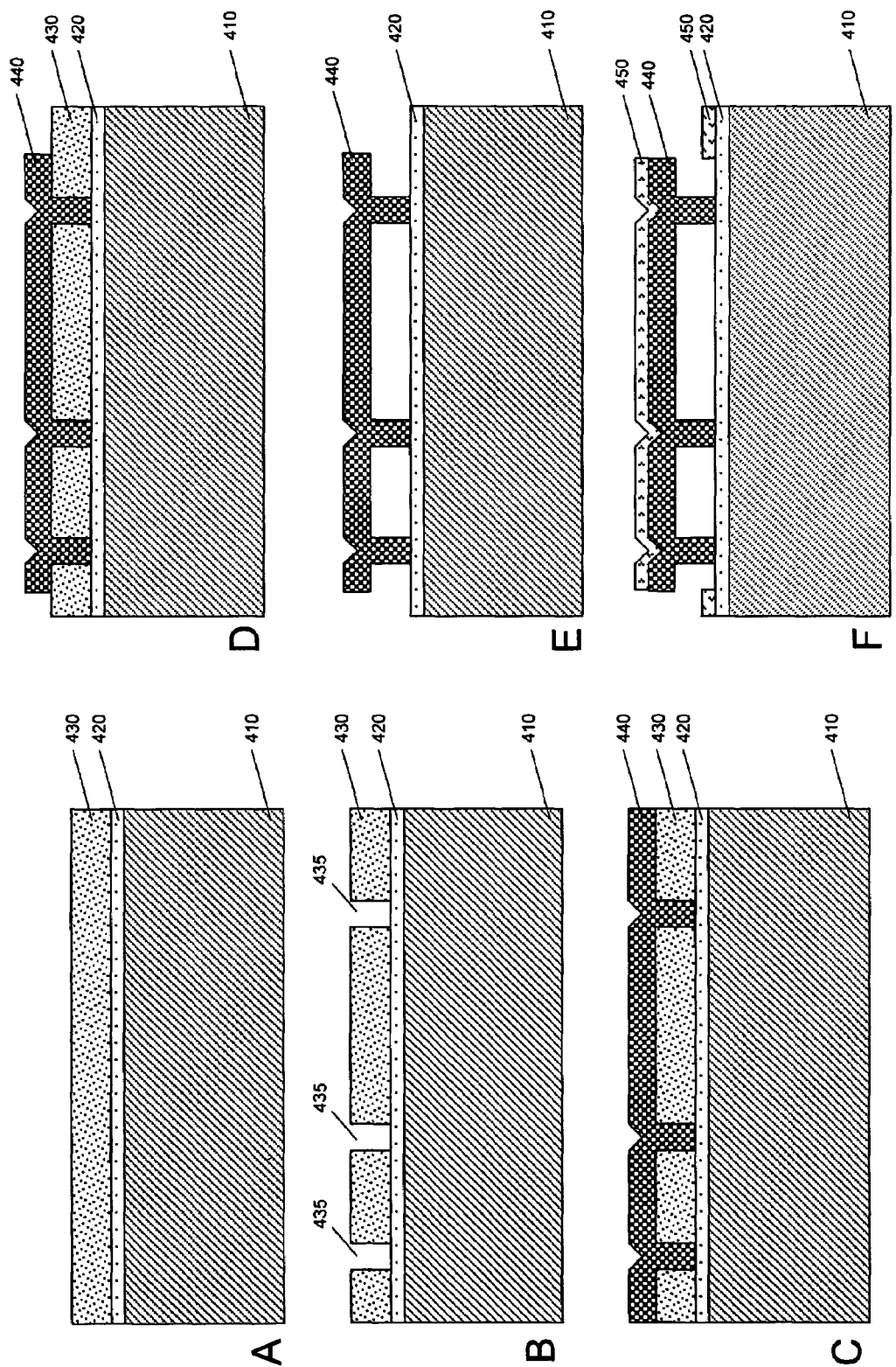
FIG. 4 shows steps in a microfabrication process for a MEMS ribbon device.

The MEMS ribbon device of FIG. 3 has been fabricated using silicon microfabrication techniques. FIG. 4 illustrates a process flow for the ribbon device. The ribbons are made of silicon nitride. They are metallized with aluminum and the whole structure is supported on a silicon wafer.

In FIG. 4, step A shows a silicon wafer 410 on which a layer of silicon dioxide 420 has been grown and a sacrificial layer of polysilicon 430 has been deposited. In step B, vias 435 have been patterned in polysilicon layer 430 using standard lithographic techniques. In step C, silicon nitride layer 440 has been deposited. Silicon nitride layer 440 covers polysilicon layer 430 and also fills vias 435. In step D, silicon nitride layer 440 is patterned using standard lithographic techniques. In step E, sacrificial polysilicon layer 430 is removed by standard etch techniques. Finally, in step F, aluminum metallization layer 450 is deposited.

Comparing FIG. 4 to FIG. 3 it is apparent that base 304 is realized by silicon wafer 410. Ribbon 306, 307 and its supports 308, 310, 312 are formed by silicon nitride layer 440. It will be easily appreciated by those skilled in the art of microfabrication that there are many possible variations on the basic process flow presented in FIG. 4.

The interferometric display device described herein has additional uses in atomic force microscopy applications. Briefly an atomic force microscope comprises a small, flexible cantilever with a sharp tip mounted on the free end. The cantilever is dragged over a surface much like a stylus in a record player.

Various optical and electronic techniques have been developed to measure the bending of the cantilever in an atomic force microscope (AFM). The techniques are so sensitive that it is possible to detect movement of the cantilever when the AFM tip is displaced by as little as the size of a single atom. The most commonly used technique is known as the optical lever and involves illuminating the cantilever with a laser beam. The beam is reflected and the intensity of the reflected light is detected with a split photodiode several centimeters away from the cantilever. A more recent interferometric technique for monitoring the deflection of a single cantilever was described in U.S. Pat. No. 5,908,981 which is herein incorporated by reference.

Recently researchers have made AFMs with linear arrays of cantilevers rather than just a single cantilever. However measuring the deflection of each cantilever in an array is challenging. The interferometer described above and illustrated in FIG. 2A may be used to measure the deflection of each AFM cantilever in an array. The cantilever array takes the place of the MEMS ribbon device as the phase shifting surface in the interferometer. Specifically, when cantilever 226 bends as it is traced over surface 228, light beams incident on the surface of the cantilever, for example light beams 218 and 220 are reflected after traveling slightly different distances to the different segments of the cantilever. An entire linear array of cantilevers may be monitored by placing a linear array photodetector at image plane 216.

The separation of light beams 218 and 220 on a cantilever may be chosen by selecting a convenient wedge angle for Wollaston prism 210 and focal length for lens 212. If the focused spots of light beams 218 and 220 are located close together or near the base of the cantilever, then the deflection of the free end may be deduced without ambiguity even if it is displaced more than one-half of the wavelength of light used in the interferometer.

In fact the interferometric devices described herein are applicable to any situation in which it is desirable to monitor a single phase shifting surface element or an array of such elements. And when the phase shifting surface itself is controlled, it may be used to generate an image in concert with the interferometer, scanning, and projection elements. Controllable phase shifting surface arrays include, for example, the MEMS ribbon device described herein and arrays of micro-cantilevers such as those used in atomic force microscopy.

As one skilled in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the invention has been described in connection with what are presently considered to be the most practical and preferred embodiments, it is to be understood that the invention is not limited to the disclosed embodiments and alternatives as set forth above, but on the contrary is intended to cover various modifications and equivalent arrangements included within the scope of the following claims.

What is claimed is:

1. An image display device comprising:
   a polarizing prism that splits a light beam into different paths corresponding to polarization components of the light;
   a microelectromechanical device that imparts a relative phase shift to the light in the paths prior to recombination of the light in the polarizing prism;
   a scanning mirror for scanning the recombined beam; and,
   a projection lens that magnifies the recombined beam.

2. A device as in claim 1 wherein the polarizing prism is a Wollaston prism.

3. A device as in claim 1 wherein the polarizing prism is a Rochon or Senarmont prism.

4. A device as in claim 1 wherein the microelectromechanical device comprises: a thin reflective ribbon; end supports at each end of the ribbon; an intermediate support located between the end supports; and, a base.

5. A device as in claim 1 wherein the microelectromechanical device comprises: a microcantilever such as an atomic force microscope cantilever.

6. An atomic force microscope comprising:
   a polarizing prism that splits a light beam into different paths corresponding to polarization components of the light; and,
   an atomic force microscope cantilever that imparts a relative phase shift to light in the paths.

7. An image display device comprising:
   an interferometer that splits a light beam into polarization components each of which travels a separate path; and,
   a microelectromechanical phase shifting surface device that imparts a relative phase shift to the polarization component in each path.

8. A device as in claim 7 wherein the phase shifting surface device is electrically controlled.

9. A device as in claim 7 wherein the phase shifting surface device comprises a linear array of phase shifting elements.

10. A device as in claim 9 further comprising a scanning mirror and a projection lens.

* * * * *